H. M. SKINNER.
Plow Colter.
No. 107,298.
Patented Sept. 13, 1870.
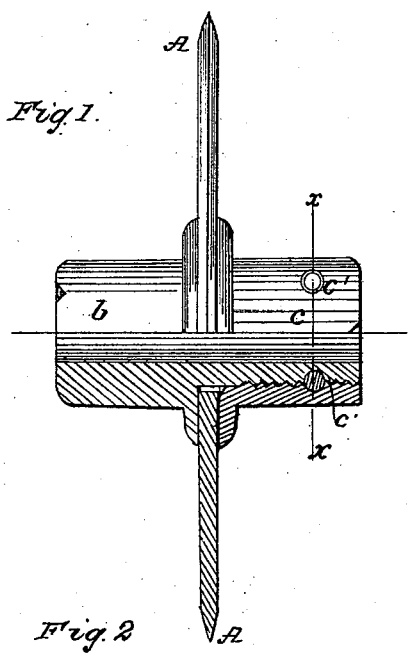
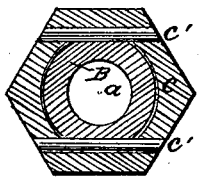
Witnesses
Inventor

UNITED STATES PATENT OFFICE.

HENRY M. SKINNER, OF ROCKFORD, ILLINOIS.

IMPROVEMENT IN COLTERS.

Specification forming part of Letters Patent No. 107,298, dated September 13, 1870.

*To all whom it may concern:*

Be it known that I, HENRY M. SKINNER, of Rockford, in the county of Winnebago and State of Illinois, have invented a new and useful Improvement in Colters; and I do hereby declare that the following is a full and exact description of the same, reference being had to the accompanying drawing, and to the letters of reference marked thereon.

This invention relates to the manner of attaching the cutting-disk of a revolving colter to its hub; and consists, mainly, in constructing the colter-hub with a hollow stem or shaft, upon the ends of which collars are fastened to secure the cutting-disk in place.

The details of construction will be fully described hereinafter.

In the drawing, Figure 1 represents a front elevation in partial section, and Fig. 2 a sectional elevation through line $x\ x$, Fig. 1.

To enable others skilled in the art to make and use my invention, I will now proceed to describe fully its construction and method of operation.

A represents the cutting-disk of the colter, which is provided with the orifice $a$ in the usual manner.

B represents a hollow stem or shaft, the inner circumference of which is of such size as to snugly fit upon the bearing-shaft upon which it revolves. Its outer circumference corresponds in size with the orifice $a$ of the cutter A. It is preferably provided at one end with a hub or collar, $b$, and at the other with screw-threads, as shown.

$c$ represents a loose hub or collar, which corresponds in size and form with the hub $b$, and is provided with internal screw-threads corresponding with the threads upon the shaft B.

When it is desired to secure the cutting-disk in place it is placed upon the shaft B in close contact with the hub $b$. The collar $c$ is now screwed upon the shaft, and the disk is thus securely held.

$c'\ c'$ represent orifices in the collar $c$, which should be bored in it when in proper position upon the shaft, in such manner as to cut slightly into the latter.

When thus constructed the collar may be secured from accidental displacement by inserting a rod into the orifice, in which position it rests in the groove in the shaft and prevents the collar from being turned.

If desired both collars may be disconnected from the shaft, and they may also be secured to it by means of keys or other suitable fastening instead of the screw-threads.

The screw may be dispensed with, if desired, and the rods or pins be used alone for attaching the hub to the colter.

Having thus fully described my invention, what I claim as new, and desire to secure by Letters Patent of the United States, is—

The specific device described, consisting of the disk A, shaft B, with collar $b$, collar $c$, with orifice $c'$, when the parts are combined and arranged as described, for the purpose set forth.

This specification signed and witnessed this 4th day of June, 1870.

HENRY M. SKINNER.

Witnesses:
   G. W. FORD,
   CHARLIE S. FORD.